United States Patent [19]

Chung

[11] Patent Number: 5,056,079
[45] Date of Patent: Oct. 8, 1991

[54] MULTI-STATE OPTICAL CONTRASTS IN OPTICAL RECORDING MEDIA FOR DATA COMPRESSION

[75] Inventor: Chi H. Chung, San Jose, Calif.

[73] Assignee: Literal Corporation, Colorado Springs, Colo.

[21] Appl. No.: 228,395

[22] Filed: Aug. 4, 1988

[51] Int. Cl.$^5$ .............................................. G11B 7/00
[52] U.S. Cl. .................................. 369/100; 369/275.2
[58] Field of Search .................... 369/275.2, 100, 110; 365/113, 168

[56] References Cited

U.S. PATENT DOCUMENTS

| | | |
|---|---|---|
| 3,902,010 | 8/1975 | Goshima . |
| 4,090,031 | 5/1978 | Russell . |
| 4,091,171 | 5/1978 | Ohta et al. . |
| 4,097,895 | 6/1978 | Spong . |
| 4,183,094 | 1/1980 | Keezer et al. ........................ 365/113 |
| 4,300,227 | 11/1981 | Dell . |
| 4,551,828 | 11/1985 | Chung . |
| 4,719,594 | 1/1988 | Young et al. ........................ 365/113 |
| 4,773,059 | 9/1988 | Minemura et al. ................. 369/100 |
| 4,797,871 | 1/1989 | Tyan et al. .......................... 365/113 |
| 4,839,861 | 6/1989 | Ikegawa et al. .................... 365/113 |
| 4,882,721 | 11/1989 | Bracht et al. ........................ 369/54 |

OTHER PUBLICATIONS

Jacoby, G., "Ternary 3 PM Magnetic Recording Code & System", IEEE Transactions on Magnetics, vol. Mag-17 #6, 3326 (1981).
Isailovic, J., *Videodisc & Optical Memory Systems*, 319 Prentice-Hall (1985).
Bouwhuis, G., *Principles of Optical Disc Systems*, 222, Adam Hilger Ltd. (1985).

*Primary Examiner*—Donald McElheny, Jr.
*Attorney, Agent, or Firm*—Kinney & Lange

[57] ABSTRACT

A method and apparatus for increasing the information storage capacity of optical recording structures by utilizing a laser beam of different powers to produce a selected one of a plurality of different physical states. These states each produce a different optical contrast. If the number of different optical contrasts is greater than two, then encoding schemes based on three or more bits may be used to store the information thus increasing the data density on the optical recording structure, such as an optical disc. In order to promote the stability of the physical states and to enhance the speed of transition between the states, a stabiliment layer is added adjacent and covering the photosensitive layer of the disc. The stabiliment layer itself is ablated in the ablation state of the photosensitive layer.

15 Claims, 3 Drawing Sheets

5,056,079

MULTI-STATE OPTICAL CONTRASTS IN OPTICAL RECORDING MEDIA FOR DATA COMPRESSION

FIELD OF THE INVENTION

The present invention relates generally to the field of data compression in information recording structures and more particularly to a method of increasing the information density of optical recording structures by utilizing various physical states of the recording medium to produce multiple states of reflectivity to represent information.

BACKGROUND OF THE INVENTION

The optical disc has become increasingly popular in recent years. Audio compact discs, video discs, and digital optical recording for computer data storage are in widespread use. Optical discs feature fast random access, high information density, and long wear because there is no mechanical contact in read/write processes.

Generally, optical information storage on discs works in the following way. A laser beam, modulated by an information signal, writes on the disc by thermally altering the disc medium in some way to produce an optical contrast (typically from a change in reflectivity of the medium). A read-out laser beam follows the information-laden alterations in the disc and a photodetector converts the changes in optical contrast to electrical signals. Audio and computer data signals are typically digitally stored while video signals are stored in frequency-modulated analog form.

Optical contrast may be achieved by changes in reflectivity, signal phase, or state of polarization. Reflectivity changes result from the scattering of light off of an altered physical feature of the disc such as a hole or a bump, or by exposing a reflecting layer through a hole in a non-reflecting surface. Signal phase changes result from the changed path length of the light beam due to the altered relief of the disc. The signal phase relationships of course also affect the reflectivity because of changes in intensity of the reflected beam due to constructive or destructive interference. Information-bearing polarization changes result from a rotation of the plane of polarization due to an altered magnetization of the disc (Faraday or Kerr Effects).

Optical discs basically consist of a thin photosensitive film deposited on a supporting substrate. There also may be intermediate layers such as dielectric spacers for increasing the path length to produce constructive interference, polymer layers for producing gas for bubble formation, mirrored surfaces for increasing reflectivity, and triggering layers to implement or enhance reactions.

Recording information thermally on optical discs traditionally has been divided into five categories—materials depletion, materials deformation, materials interaction, phase transitions, and thermomagnetic (or magneto-optic)—although the physical phenomena occurring in these categories often overlap. The materials depletion category (often referred to as ablation) includes hole-burning and all ablative processes. The materials deformation category includes bubble formation and textured structure recording methods. The materials interaction category includes alloying of bilayers and segregation of compounds. Phase transitions include crystalline-to-amorphous and vice-versa transitions. The thermomagnetic category involves ferro- and ferrimagnetic materials subjected to external fields and irradiated by plane-polarized light beams. The essential goal of each method is to produce detectable optical contrast in the disc. Each of these recording methods will be described below.

In materials depletion optical recording, geometrical changes are induced by evaporating (ablating) a thin layer to produce optically detectable effects. The hole-burning method typically utilizes a low melting temperature metal or semi-metal thin film over a quarter wavelength spacer layer and mirrored substrate. The laser beam simply melts the thin layer material and a hole forms because of the difference in surface tension between the thin film and the underlying spacer layer or substrate. Because of the difference in reflectivity between the thin film and the mirror exposed by the hole, an optical contast is produced which reflects the information in the signal-modulated laser beam. For an example, see U.S. Pat. No. 4,097,895 to Spong.

In materials deformation optical recording, geometrical changes are induced by melting a thin layer to produce optically detectable effects. The bubble formation method uses a polymer-metal bilayer. The laser beam decomposes the polymer and the resultant emitted gas forms a bubble beneath the metal which has a diameter approximately equal to the size of the laser focused spot. The proper choice of material and layer thickness prevents the bubble from bursting. Light scattered from the bubble or transmitted through the bubble with signal phase changes will produce the desired optical contrast. See, for example, U.S. Pat. No. 4,300,227 to Bell.

The textured structure method utilizes a roughly spiked surface with local dimensions that are much smaller than the wavelength of the laser beam. The laser heats the rough surface causing the spikes to melt and the surface to flatten. The flat surface reflectivity is much higher than that of the textured surface thereby producing a strong optical contrast. See Suh, et al., "Morphology Dependent Contrast Measurements of Microscopically Textured Germanium Films", SPIE Proceedings, 382, 199 (1983).

In materials interaction recording, the optical constants of the sensitive layer are changed resulting in changes in reflectivity. Bilayer structures are known which alloy as a result of laser heating. The alloy has a different reflectivity from the separated constituents. This method is very sensitive since the laser beam need only trigger the alloying exothermic chemical reaction. See Ahn, et al., "High Sensitivity Silicide Films for Optical Recording", CLEO Proceedings, 140 (1982).

The segregation method is just the opposite of alloying in that compounds are separated by the heating action of the laser beam to cause, for instance, crystallization of one constitutent after segregation resulting in a high reflectivity. See Akahira, et al., "Sub-Oxide Thin Films for an Optical Recording Disk", SPIE Proceedings, 329, 195 (1982).

In phase transition recording, the crystalline-amorphous and vice-versa transitions produce changes in the optical density of the strucuture, resulting in changes in the reflectivity. See, for example, U.S. Pat. No. 4,091,171 to Ohta, et al.

Thermomagnetic recording utilizes the intrinsic magnetic field of ferro- and ferrimagnetic materials. To write on the disc, a small external magnetic field is applied with a direction opposite that of the intrinsic field of the ferro- or ferrimagnetic materials used in a layer on the disc. Heating by the laser beam above the Curie temperature results in the magnetic moments of the layer lining up with the external field direction. A linearly-polarized read-out laser beam will have its plane of polarization rotated as a result of reflection by the disc surface at the locations where the magnetic field has changed direction (Faraday or Kerr Effects). A polarizer with its plane normal to one of the states of polarization can decode the signal. See Bouwhuis, G., *Principles of Optical Disc Systems*, 222, Adam Hilger Ltd. (1985).

Typically, optical discs have grooves already cut into the disc. The space between the grooves may be called the "land." Information may be stored in "pits" (the holes from hole-burning) and/or "bumps" (the bubbles from bubble formation) on the land or in the grooves.

In all applications of information storage devices, the greater the information capacity, the greater the capability of the machine using the device and the smaller the whole system may be. The importance of miniaturization has been demonstrated in the development of audio, video, and computer data storage devices. Magnetic tape became a major consumer product only after it was miniaturized into cassettes. Early video tape machines were bulky and could store only an hour of programming. Early computers used punched cards, paper tape, and reels of magnetic tape which presented severe physical storage problems. The application of data compression methods made possible the now common floppy discs, hard discs, and optical discs for computers, and automobile cassette stereos, compact disc players, and mini-VCRs.

One way of increasing the data density of a data record is to change the way that information is encoded. For example, if the well-known binary coding system used in computers (where "0" and "1" are the bits) were converted to a ternary coding system (using "0", "1", and "2" as bits), the amount of data capable of storage would increase. For instance, in magnetic recording devices such as computer disc drives, the bit density may be increased by using a ternary alphabet instead of the common binary alphabet. Data is typically encoded in a stream of bits on a record track. A quantity called the density ratio is a measure of the amount of information capable of being stored in a given length of track. The density ratio equals the code rate times the minimum distance between two consecutive non-zero symbols. The code rate is just the number of data bits divided by the number of code symbols. Using a ternary alphabet instead of a binary alphabet allows an increase in the code rate while maintaining the minimum distance. Thus, the density ratio is increased merely by converting to a ternary system. For details, see Jacoby, G., "Ternary 3PM Magentic Recording Code and System", IEEE Transactions on Magnetics, Vol. Mag-17, No. 6, 3326 (1981).

In the binary code, the minimum number of bits, "a", in each word for storage of information having "M" words is $$2^a = M.$$

When a ternary alphabet is used, the same information can be stored in a word that uses "b" bits; that is, as long as $$3^b \geq M.$$

the minimum is when $$3^b = M,$$

therefore, $$2^a = M = 3^b$$

or $$a/b = ln(3)/ln(2) = 1.58.$$

In other words, the amount of space in the medium that is required for storing M words using a bianry code is 1.58 times the space required when using a ternary code. This is an increase in capacity of over 50%.

In general, the equation for the factor increase in data density R as a function of number of reflectivity states N is $$R = ln(N)/ln2.$$

There have been various attempts to increase the information-carrying capacity of optical discs. There are, for instance, a number of known schemes where recording pits of different lengths may be used to represent specific combinations of data bits.

In another scheme, U.S. Pat. No. 4,090,031 to Russell discloses an optical disc with multiple layers for data storage. Specific layers are accessed by either focusing or filtering a write/read light beam. Transparent spacer layers are used to separate the data layers. The non-accessed layers must also be sufficiently transparent when out of focus to enable unimpeded reading of a selected layer. If white light is used as the write/read beam, filters may be used to access specific data layers. Russell's invention requires a special structure of multiple data storage layers made of transparent materials and a light beam capable of writing on and reading from the desired layer by focusing on that layer alone and not disturbing other layers. In the case of using filters for data layer selection, the use of a white light write/read beam for optical disc recording is not common. White light sources have not been used because only the concentrated power of lasers provide the required signal-to-noise ratios from extremely small areas on the disc and for the extremely short read time intervals.

Another scheme to increase data density uses different wavelengths to record, and filters to read the desired data. A photochemical medium can store many bits of information at each location using certain substances with wavelength-dependent absorption. To write, a laser is tuned to any of up to 1000 discrete frequencies. At each frequency, a small portion of the molecules at the irradiated site undergo chemical tranformations which rob them of their abiity to absorb again at that frequency. Such a recording structure is called a frequency-spatial memory. See Isailovic, J., *Videodisc and Optical Memory Systems*. 319, Prentice-Hall (1985). This scheme requires special photochemical materials and structures for the optical recording medium, tunable write lasers, scanning read lasers, and a new control system for implemention.

U.S. Pat. No. 3,902,010 to Goshima discloses an optical disc with two data layers of different sensitivity. The high sensitivity layer stores the modulated, information-carrying light beam signals and the low sensitivity layer stores the unmodulated guide beam which controls the light beam. Although there are layers of different photosensitivity, Goshima's invention provides a means for guiding the light beam and storing data on optical discs; it does not increase data capacity.

It is therefore an object of the present invention to provide a method for increasing the information storage capacity of optical discs.

A further object of the present invention is to provide a method for increasing the information storage capacity of presently existing optical disc structures without the need to modify either the discs or the wavelength of the laser beam used to record on, and read out from, the disc.

Another object of the present invention is to provide an optical recording structure with different states of optical contrast that are sufficiently stable for optical information storage uses.

These and other objects of the present invention will become obvious to those skilled in the art from the following detailed description of the invention and the accompanying drawings.

SUMMARY OF THE INVENTION

Broadly, the present invention comprises a method for increasing the information storage capacity of optical recording structures by enabling each location on the optical recording structure to have a selected one of a plurality of possible physical states. These states each produce a different optical contrast. If the number of different optical contrasts is greater than two, then encoding schemes based on three or more bits may be used to store the information. This increases the data density on the disc according to the equation $R = \ln N / \ln 2$ where R is the factor increase in information storage capacity and N is the number of optical contrasts. The different physical states of the optical recording structure are produced by irradiating the optical recording structure by a light source of a single wavelength and varying the power. The different optical contrasts created by the different physical states are discernible using a read-out light beam.

The present invention also comprises an optical recording structure having a plurality of photosensitive layers capable of being in a plurality of physical states, each state having a different reflectivity with a first physical state having a first reflectivity, and a plurality of additional reflectivities being produced by irradiating the photosensitive layer in different locations by a laser beam of a plurality of different optical powers to produce the plurality of physical states, and a stabiliment layer, adjacent and covering the photosensitive layer, for promoting the stability of the different physical states of the photosensitive layer over a wide range of irradiating powers and also for enhancing the speed of transition between the different physical states.

DETAILED DESCRIPTION OF THE INVENTION

The present invention exploits the existence of multiple physical states of the optical recording structure resulting from the thermal effects produced by a laser beam of different powers. It is not commonly known that many ablative optical recording structures can go through various different physical states before reaching final ablation. When these states have been observed, their presence has commonly been suppressed in an attempt to achieve a wider laser power operational range. For example, in a phase transition structure, in going from the amorphous state to a crystalline state, the laser beam power may be high enough to ablate the medium resulting in a poorly defined signal. This is typically avoided by utilizing some high melting point material as a protective film to suppress the ablation. The laser then may be operated over a wider range without fear of ablating the recording structure.

Contrary to the teachings of this art, the present invention utilizes and takes advantage of the existence of these different physical status because they exhibit different reflectivities under a read-out light beam. This allows the data density of optical discs to be increased without altering the already well-tested discs themselves or changing the wavelength of the lasers. In some cases, the addition of a "stabiliment" layer helps to promote the stability of one or more of the reflectivity states.

For ease of understanding, some terminology is introduced as follows. The state of reflectivity of the optical recording structure in its condition before irradiation by laser light is called the "original" state of reflectivity. Any level of reflectivity greater than the original level is called "high-state reflectivity." Any level of reflectivity less than the original level is called "low-state reflectivity." If there are more than one level of high-state reflectivity, they are termed "first high-state reflectivity", "second high-state reflectivity" etc. and similarly for low-state reflectivities. The states of the recording structure producing the different states of reflectivity are identified by their commonly used names (such as bubble, texture, ablated, etc.).

Following are some examples of various physical states of optical recording structures produced from irradiation by different laser beam powers. The states exhibit different reflectivities under low-power read-out beams. All the states in the examples given are sufficiently stable for use in optical recording. The examples are meant to illustrate the invention which is not to be limited in any way to the descriptions contained in the examples.

EXAMPLE 1: BUBBLE/ABLATION

Figure 1A:
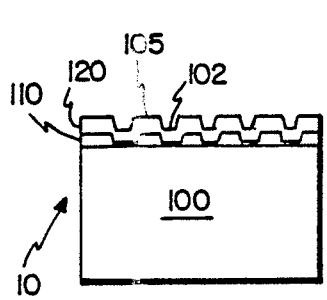
FIGS. 1(a), (b), and (c) are cross-sectional views showing the possible physical states of bubble-formation and ablation in a pregrooved optical recording structure which is irradiated by a laser beam according to the present invention.

FIGS. 1 through 6 are all cross-sectional views of optical recording structures comprising a substrate, for example 100 in FIG. 1(a), and one or more layers, such as 110 and 120 in FIG. 1(a). There are grooves, such as 102 in FIG. 1(a) cut or stamped into the layers with the area adjacent to the grooves referred to as land, such as 105 in FIG. 1(a). A light beam irradiates the layers, typically from below (through the substrate), heating a layer and creating deformities in the layer. The proportions in FIGS. 1 through 6 are meant to be representative only and are thus not necessarily to scale.

FIG. 1 shows the possible physical states of bubble-formation and ablation in a pregrooved optical recording structure which is irradiated by a laser beam. FIG. 1(a) shows an optical record structure 10 in its original state prior to irradiation by a laser beam. Optical record structure 10 consists of a substrate 100 adajacent a polymer layer 110 which is overlain by a metal layer 120 in a typical bubble-formation structure. With a laser optical power between 0.5 mW and 1.5 mW, which is the common read-out range for optical discs, the reflectivity of the original state of optical recording structure 10 is in the range of 10% to 25%.

Figure 1B:
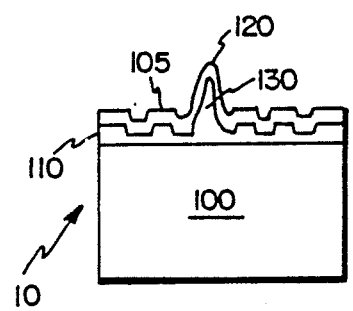

FIG. 1(b) shows bubble formation and the high state reflectivity resulting therefrom. The laser beam melts part of polymer layer 110 producing a gaseous emission which forms a bubble 130 under metal layer 120. With proper laser irradiation power and duration, bubble 130 can have a geometrical extent such that light reflected from the surface of bubble 130 and light reflected from polymer layer 110 constructively interfere resulting in a positive superposition of reflected waves and a subsequent enhanced reflectivity. Laser irradiation powers between 4 mW and 8 mW will form bubble 130. The reflectivity is in the range of 50% to 80%, constituting a high-state reflectivity. The original reflectivity is produced by the land 105.

Figure 1C:
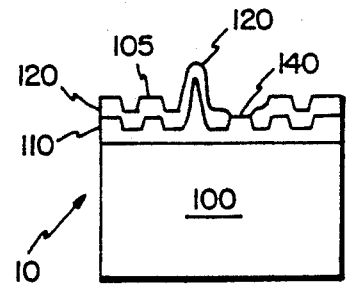

FIG. 1(c) shows an ablated state of optical record structure 10. Laser irradiation of optical power between 9 mW and 15 mW results in the formation of a hole 140 resulting from the ablation of metal layer 120. Because polymer layer 110 has a different reflectivity from metal layer 120, this ablated state exhibits a low-state reflectivity in the range of 6% to 12%. The bubble 120 and the original land 105 are also shown, providing the high-state and original-state reflectivities respectively.

The three states of reflectivity—original, high-state, and low-state—can be achieved using existing optical disc materials such as those manufactured by RCA and 3 M.

EXAMPLE 2: FILM/TEXTURE/ABLATION

FIG. 2 illustrates the possible physical states of a textured, pregrooved optical recording structure 20. FIG. 2(a) shows a thin film 220 on a textured medium 210 resting on a substrate 200. Thin film 220 is thin enough to roughly follow the contours of the texturing of textured medium 210 and may be either continuous or discontinuous. This is the original state as shown at 205 and has a reflectivity in the range of 15% to 20%.

Figure 2A:
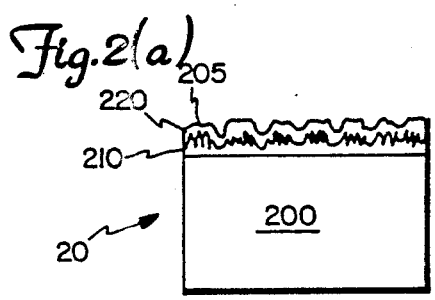
FIGS. 2(a), (b), (c), and (d) are cross-sectional views showing the possible physical states of a textured, pregrooved optical recording structure which is irradiated by a laser beam according to the present invention.
Figure 2B:
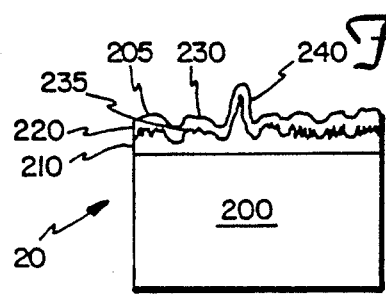

FIG. 2(b) shows that, after irradiation by a laser beam of optical power between 3 mW and 6 mW, textured structure 210 is partially filled-in at 235 with melted film 230. This results in a high-state reflectivity in the range of 20% to 30%. At this same laser beam power, a bubble 240 may also form resulting in high-state reflectivity in the same range of 20% to 30%. The original state is provided by the land at 205.

Figure 2C:
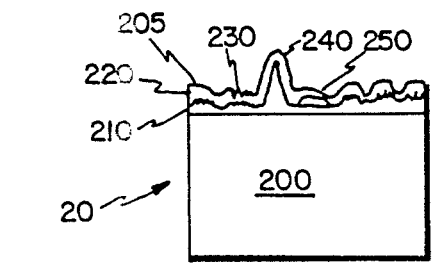

FIG. 2(c) shows, at 250, that after irradiation by a laser beam of optical power between 6 mw and 10 mW, film 220 has melted and textured structure 210 has collapsed. This results in a second high-state reflectivity in the range of 40% to 70%. The original land 205, the partially filled-in texture 230, and the bubble 240 provide the original and two equal high-state reflectivities respectively.

Figure 2D:
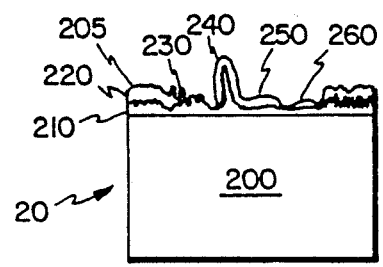

FIG. 2(d) shows, at 260, that after irradiation by a laser beam of optical power between 10 mW and 15 mW, film 220 has ablated at 250 exposing collapsed textured structure 210. Textured structure 210 is typically made from polymers with a very low reflectivity. This state results in a low-state reflectivity in the range of 6% to 12%. The original land 240, the partially filled-in texture 230, the bubble 240, and the melted film and collapsed texture 250 provide the original, two equal high-states, and the second high-state reflectivities respectively.

Example 2 illustrates the possibility of four different states of reflectivity within the same optical recording structure: the original, a first high-state, a second high-state, and a low-state. A recording disc of the film/texture type is made by Plasmon. Platinum has been used in the prior art for thin film structures, but it has not been ductile enough to allow bubble formation. One embodiment of the present invention utilizes a metallic thin film with melting temperatures between 400° C. and 900° C. For example gold, silver, and their alloys may be used. To promote formation of the bubble, a triggering layer may be placed between the texture and the thin film. Such a triggering layer is described in U.S. Pat. No. 4,551,828 to Chung.

EXAMPLE 3: PHASE TRANSITION/ABLATION

FIG. 3 shows three possible physical states in a phase-transition type pregrooved optical recording structure 30. A substrate 300 with stamped grooves 310 supports a material 320 capable of amorphous to crystalline phase transitions.

Figure 3A:
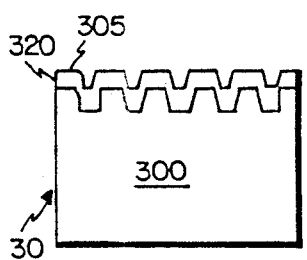
FIGS. 3(a), (b), and (c) are cross-sectional views showing the possible physical states of an amorphous to crystalline phase transition optical recording structure which is irradiated by a laser beam according to the present invention.
Figure 3B:
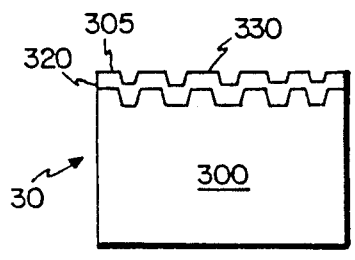
Figure 3C:
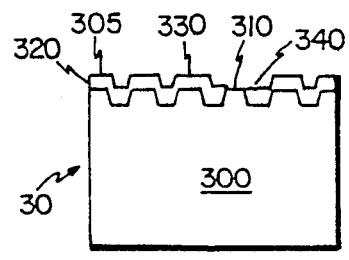

FIG. 3(a) shows the original state with layer 320 in an amorphous state. The original state has a reflectivity in the range of 15% to 35% as represented by land at 305. Upon irradiation by a laser beam of optical power between 3 mW to 8 mW, layer 320 becomes crystalline with a resultant change of relectivity at 330 to the range of 40% to 50% as shown in FIG. 3(b). The original reflectivity is represented at 305. Irradiation by a laser beam of optical power 9 mW to 15 mW results in layer 320 being ablated at 340 thereby exposing underlying surface 310 as shown in FIG. 3(c). Surface 310 has a low-state reflectivity in the range of 6% to 12%. The original and the crystalline states are shown at 305 and 330 respectively and provide the original and high-state reflectivities.

Figure 4:
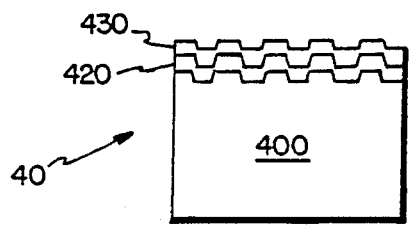
FIG. 4 is a cross-sectional view showing a crystalline to amorphous phase transition optical recording structure with a stabiliment layer according to the present invention.

If a very high output power diode laser is used for recording, the three states of reflectivity can be made stable within single amorphous-to-crystalline layer 320. For conventional power diode lasers, three stable states of reflectivity are achieved according to the present invention with the addition of a "stabiliment" layer. This stabiliment layer can also enhance the speed of transition between the various states. As shown in FIG. 4, such a stabiliment layer 430 is positioned on top of layer 420 in optical recording structure 40. Layer 420 can be a conventional chalcogenide film or any phase-change thin film that exhibits a crystallization temperature preferably between 150° C. and 250° C. Stabiliment layer 430 can be a metal, oxide, or halide thin film which does not interact with layer 420 at a temperature below the crystallization temperature of layer 420. Stabiliment layer 430 will be ablated along with layer 420 under irradiation of a laser beam producing temperatures of 500° C. to 700° C. An embodiment of the present invention utilizes a compound of germanium, selenium and tellurium for layer 420 and indium oxide or an alloy of indium oxide for stabiliment layer 430. Another embodiment of the present invention utilizes tellurium suboxide for layer 420 and a very thin gold or tin oxide film for stabiliment layer 430.

If other materials are employed and the phase transition is from crystalline to amorphous, the reflectivities are different. Referring back to FIG. 3, in the crystalline state layer 320 will have a reflectivity in the range of 35% to 50%, representing an original state. The amorphous state of layer 320 results from a laser irradiation of optical power between 3 mW to 6 mW and has a reflectivity in the range of 25% to 30%. This is the first low-state reflectivity. A second low-state reflectivity in the range of 6% to 12% results from ablation of layer 320 under a laser irradiation of between 7 mW to 10 mW.

Common phase transition type optical recording structures suitable for this three-state reflectivity use are made by, among others, Matsushita, ECD, Asahi Chemical, and Hitachi.

EXAMPLE 4: ALLOYING/ABLATION

FIG. 5 shows the physical states in a pregrooved alloying/ablation optical recording structure 50. Substrate 500 has a stamped groove structure which is overlain by layers 520 and 530 which are capable of chemical combination under laser beam irradiation.

Figure 5A:
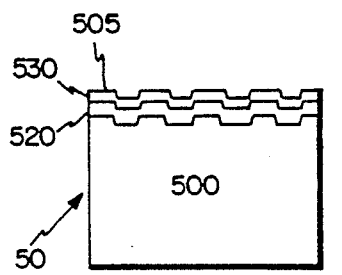
FIGS. 5(a), (b), add (c) are cross-sectional views showing the possible physical states of a substances interaction (alloying) optical recording structure which is irradiated by a laser beam according to the present invention.
Figure 5B:
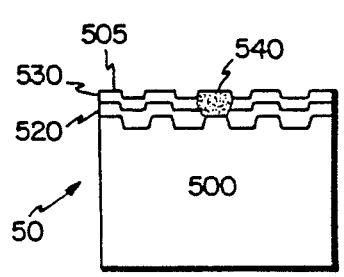
Figure 5C:
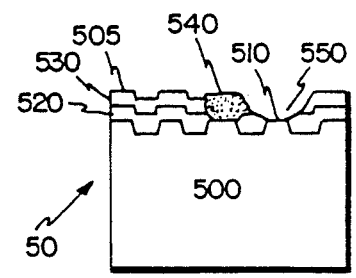

FIG. 5(a) shows optical recording structure 50 before irradiation by the laser beam. In this state of separate layers 520 and 530, the original reflectivity is in the range of 15% to 30% as represented by land 505. FIG. 5(b) shows at 540 the alloying (or substances interaction) of layers 520 and 530 after irradiation by a laser beam of optical power between 4 mW and 8 mW. The high-state reflectivity of this physical state is in the range of 30% and 50%. FIG. 5(c) shows at 550 the ablation of layers 520 and 530 after irradiation by a laser beam of optical power between 9 mW to 15 mW. The resultant low-state reflectivity between 6% to 12% reflects the low reflectivity of layer 510 which is now exposed. Also shown are the original land 505 and the interacted substances 540 providing the original and high-state reflectivities respectively.

Substances interaction optical recording structures are manufactured, for instance, by Sony.

Figure 6:
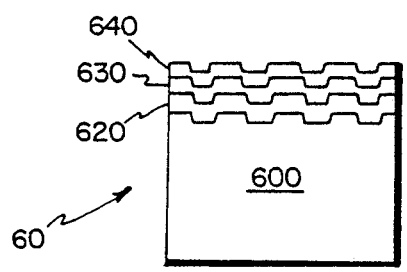
FIG. 6 is a cross-sectional view showing the substances interaction (alloying) optical recording structure with a stabiliment layer according to the present invention.

Referring to FIG. 6, optical recording structure 60 is the same as optical recording structure 50 in FIG. 5 except that, in order to achieve a sufficient stability of the reflective states, a stabiliment layer 640 is added on top of alloying layers 620 and 630. This stabiliment layer can also enhance the speed of transition between the various states. Stabiliment layer 640 is ablated along with layers 620 and 630 in the ablated state. In an embodiment of the present invention, tellurium oxide and vanadium oxide are the layers 620 and 630 respectively, and tin oxide is used for stabiliment layer 640. In another embodiment of the present invention, gallium arsenide and indium oxide are used for layers 620 and 630 respectively, and a very thin gold film is used for layer 640.

In the above-described Examples 1 through 4, to prevent the read scanning spot from picking up unwanted signals from tracks neighboring the track of interest (cross-talk), it is advantageous to utilize a sawtooth structure for the optical recording medium.

An embodiment of the present invention utilizes the three reflectivity states described in Example 3 for the amorphous-to-crystalline phase transition. The ternary alphabet may be defined as: "0" = original state (amorphous); reflectivity = 25% "1" = low-state (ablated); reflectivity = 7% "2" = high-state (crystalline); reflectivity = 55%. It is understood that any designation of states corresponding to the 0, 1, and 2 of the alphabet is possible.

The common binary code may then, for example, be mapped into the ternary code as follows:

| Binary | Ternary |
|---|---|
| 000 | 00 |
| 001 | 01 |
| 010 | 10 |
| 011 | 02 |
| 100 | 12 |
| 101 | 21 |
| 110 | 20 |
| 111 | 11 |

The factor increase R in data density is $$R = ln3/ln2 = 1.58$$

If there are more than three states of reflectivity, then the increase in data density will be even greater. For instance, in Example 2 there are four states of reflectivity so the factor increase in data density is ln4/ln2 = 2. In general, the greater the number of reflectivity states, the greater the increase in data density possible.

Figure 7:
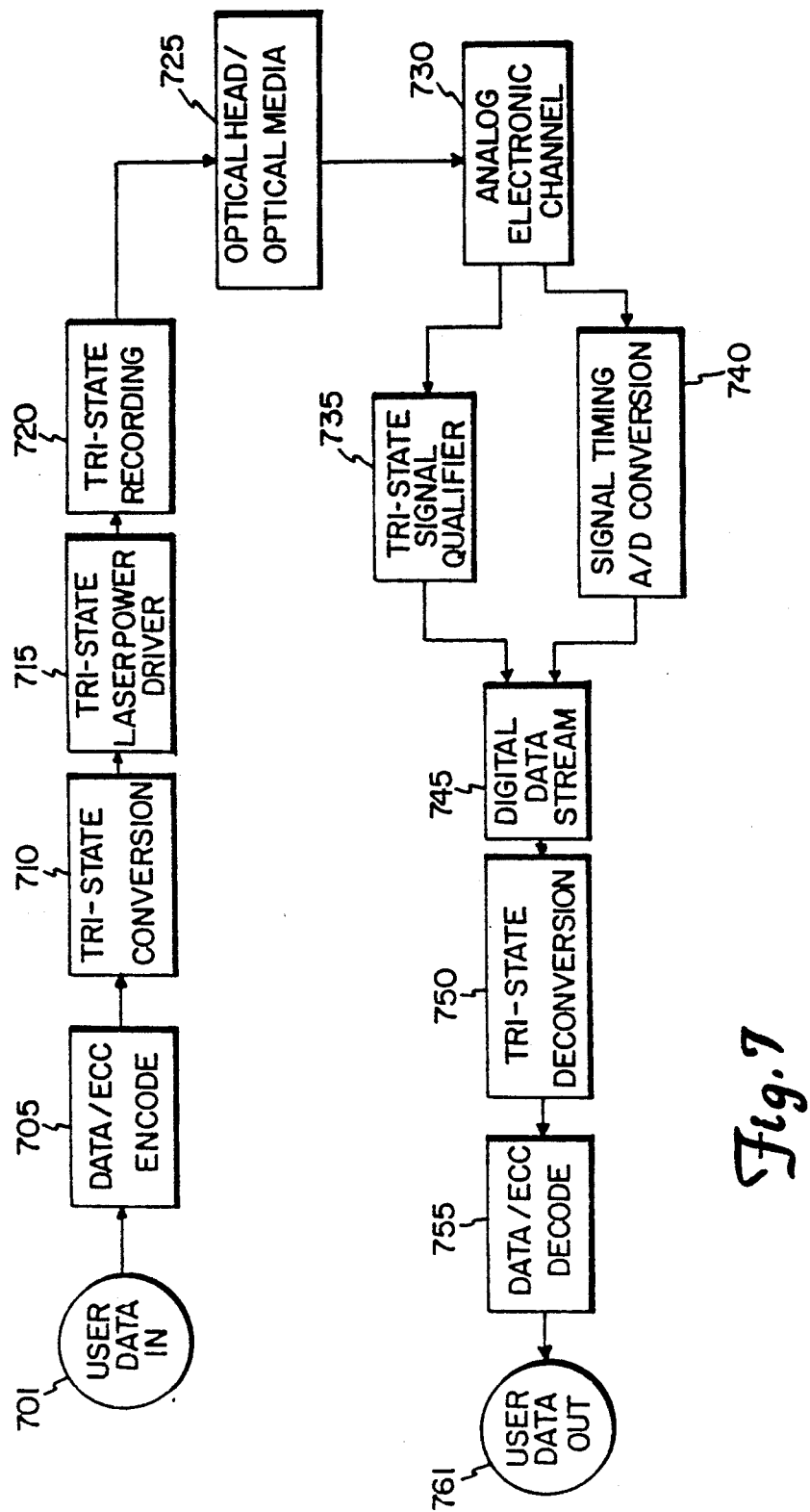
FIG. 7 is a block diagram illustrating a tri-state optical data writing and reading system.

FIG. 7 is a block diagram illustrating a tri-state optical data writing and reading system. User data is entered at 701 in any suitable manner such as digitized audio signals or computer outputs. The binary-coded data has added to it extra bits for error correction and detection (ECC) at 705. At 710, the binary data are converted to a ternary code (as, for example in the conversion table given previously). At 715, the ternary data signals drive a diode laser to emit the appropriate powers for writing the data. That is, different powers of the laser will be emitted according to whether the bit seen is 0, 1, or 2. The laser beam writes on the optical recording structure at 720. The read-out process begins at 725, where the optical head reads the reflected beams by means of, for instance, a photodetector. At 730, the analog electronic channel treats the analog data preparatory to digitization (for instance, by smoothing it out). The analog signals are then converted to digital signals through discrimination of the reflectivity states at 735 and determination of the timing relationships at 740. The data are converted to a digital data stream at 745 and pass to a tri-state deconversion process at 750 which converts the ternary code back to a binary code. At 755 the data and the ECC bits are decoded and the reader-usable data is outputted at 761.

There has been described herein a novel system for increasing the data density of optical recording structures. Various modifications to the present invention will become apparent to those skilled in the art from the foregoing description and accompanying drawings. Accordingly, the present invention is to be limited solely by the scope of the following claims.

What is claimed is:

1. A method to increase the information storage capacity of optical recording structures having a photosensitive layer in a first physical state having a first reflectivity comprising the steps of:
   irradiating the photosensitive layer in a first location by a laser beam of a first optical power modulated by a first digital information carrying signal creating a second physical state having a second reflectivity representative of the first digital information carrying signal, and
   irradiating the photosensitive layer in a second location by a laser beam of a second optical power modulated by a second digital information carrying signal creating a third physical state having a third reflectivity representative of the second digital information carrying signal wherein the first, second, and third physical states are representative of digital information carried on the photosensitive layer.

2. The method of claim 1 wherein
   the first physical state of the photosensitive layer is amorphous,
   the second physical state of the photosensitive layer is crystalline, and
   the third physical state of the photosensitive layer is an ablated state.

3. The method of claim 1 wherein
   the first physical state of the photosensitive layer is crystalline,
   the second physical state of the photosensitive layer is amorphous, and
   the third physical state of the photosensitive layer is an ablated state.

4. The method of claim 1 wherein
   the original reflectivity is produced by separated chemical substances,
   the second physical state of the photosensitive layer is the chemical substances chemically combined, and
   the third physical state of the photosensitive layer is an ablated state.

5. A method to increase the information storage capacity of optical recording structures having first and second photosensitive layers in a first physical state having a first reflectivity comprising the steps of:
   irradiating the first and second photosensitive layers in a first location by a laser beam of a first optical power modulated by a first digital information carrying signal creating a second physical state having a second reflectivity, representative of the first digital information carrying signal, and
   irradiating the first and second photosensitive layers in a second location by a laser beam of a second optical power modulated by a second digital information carrying signal creating a third physical state having a third reflectivity representative of the second digital information carrying signal, wherein the first, second, and third physical states are representative of digital information carried in the first and second photosensitive layers.

6. The method of claim 5 wherein
   the first photosensitive layer is a polymer layer,
   the second photosensitive layer is a metallic layer,
   the second physical state is a bubble-formation state, and
   the third physical state is an ablated state.

7. A method to increase the information storage capacity of optical recording structures having first and second photosensitive layers in a first physical state having a first reflectivity comprising the steps of:
   irradiating the first and second photosensitive layers in a first location by a laser beam of a first optical power modulated by a first digital information carrying signal creating a second physical state having a second reflectivity representative of the first digital information carrying signal,
   irradiating the first and second photosensitive layers in a second location by a laser beam of a second optical power modulated by a second digital information carrying signal creating a third physical state having a third reflectivity representative of the second digital information carrying signal,
   irradiating the first and second photosensitive layers in a second location by a laser beam of a second optical power modulated by a third digital information carrying signal creating a fourth physical state having a fourth reflectivity representative of the third digital information carrying signal wherein the first, second, third, and fourth physical states are representative of digital information carried by the first and second photosensitive layers.

8. The method of claim 7 wherein
   the first photosensitive layer is a textured layer,
   the second photosensitive layer is a thin film layer,
   the second physical state is a state wherein the thin film partially fills in the textured layer,
   the third physical state is a state wherein the melted film lays on the collapsed texture, and
   the fourth physical state is an ablated state.

9. The method of claim 7 wherein
   the first photosensitive layer is a textured layer,
   the second photosensitive layer is a thin film layer,
   the second physical state is a bubble-formation state,
   the third physical state is a melted film on collapsed texture state, and
   the fourth physical state is an ablated state.

10. A method to increase the information storage capacity of optical recording structures having a photosensitive layer capable of amorphous to crystalline transition and ablation, and having a first reflectivity in the range of 15% to 35%, comprising the steps of:
    irradiating the photosensitive layer at a first location by a laser beam of optical power in the range of 3 mW to 8 mW modulated by a first digital information carrying signal producing an amorphous to crystalline transition, thereby creating a second reflectivity of the optical recording structure at the first location in the range of 40% to 50% representative of the first digital information carrying signal, and
    irradiating the photosensitive at a second location by a laser beam of optical power in the range of 9 mW to 15 mW modulated by a second digital information carrying signal producing an ablation of the photosensitive layer, thereby creating a third reflectivity of the optical recording structure at the second location in the range of 6% to 12% representative of the second digital information carrying signal, wherein the first, second, and third reflectivities are representative of digital information stored on the optical recording structure.

11. A method to increase the information storage capacity of optical recording structures having a photosensitive layer capable of crystalline to amorphous transitions and ablation, and having a first reflectivity in the range of 35% to 50%, comprising the steps of:

irradiating the photosensitive layer at a first location by a laser beam of optical power in the range of 3 mW to 6 mW modulated by a first digital information carrying signal producing a crystalline to amorphous transition, thereby creating a second reflectivity of the optical recording structure at the first location in the range of 25% to 30% representative of the first digital information carrying signal, and irradiating the photosensitive layer at a second location by a laser beam of optical power in the range of 7 mW to 10 mW modulated by a second digital information carrying signal producing an ablation of the photosensitive layer, thereby creating a third reflectivity of the optical recording structure at the second location in the range of 6% to 12% wherein the first, second and third reflectivities are representative of digital information stored on the optical recording structure.

12. A method to increase the information storage capacity of optical recording structures having first and second photosensitive layers capable of bubble formation and ablation, and having a first reflectivity in the range of 10% to 25%, comprising the steps of:

irradiating the photosensitive layers at a first location by a laser beam of optical power in the range of 4 mW to 8 mW modulated by a first digital information carrying signal producing a bubble, thereby creating a second reflectivity of the optical recording structure at the first location in the range of 50% to 80% representative of the first digital information carrying signal, and irradiating the photosensitive layer at a second location by a laser beam of optical power in the range of 9 mW to 15 mW modulated by a second digital information carrying signal producing an ablation of the first photosensitive layer, thereby creating a third reflectivity of the optical recording structure at the second location in the range of 6% to 12% wherein the first, second and third reflectivities are representative of digital information stored on the optical recording structure.

13. A method to increase the information storage capacity of optical recording structures having a first photosensitive layer of a thin film and a second photosensitive layer of a textured material, the layers capable of melting and ablation, and having a first reflectivity in the range of 15% to 20%, comprising the steps of:

irradiating the photosensitive layer at a fist location by a laser beam of optical power in the range of 3 mW to 6 mW modulated by a first digital information carrying signal producing melting of the thin film on the texture thereby creating a second reflectivity of the optical recording structure at the first location in the range of 20% to 30% representative of the first digital information carrying signal, p1 irradiating the photosensitive layer at a second location by a laser beam of optical power in the range of 6 mW to 10 mW modulated by a second digital information carrying signal producing melting of the thin film and collapsing of the texture, thereby creating a third reflectivity of the optical recording structure at the second location in the range of 40% to 70% representative of the second digital information carrying signal, and irradiating the photosensitive layers at a third location by a laser beam of optical power in the range of 10 mW to 15 mW modulated by a third digital information carrying signal producing an ablation of the photosensitive layers, thereby creating a fourth reflectivity of the optical recording structure at the third location in the range of 6% to 12% representative of the third digital information carrying signal wherein the first, second, third, and fourth reflectivities are representative of digital information stored on the optical recording structure.

14. A method to increase the information storage capacity of optical recording structures having a first photosensitive layer of a thin film and a second photosensitive layer of textured material, the layers capable of melting, bubble-formation, and ablation, and having a first reflectivity in the range of 15% to 20%, comprising the steps of:

irradiating the photosensitive layer at a first location by a laser beam of optical power in the range of 3 mW to 6 mW modulated by a first digital information carrying signal producing a bubble on the texture, thereby creating a second reflectivity of the optical recording structure at the first location in the range of 20% to 30% representative of the first digital information carrying signal, irradiating the photosensitive layer at a second location by a laser beam of optical power in the range of 6 mW to 10 mW modulated by a second digital information carrying signal producing a melting of the thin film and collapsing of the texture, thereby creating a third reflectivity of the optical recording structure at the second location in the range of 40% to 70% representative of the second digital information carrying signal, and irradiating the photosensitive layers at a third location by a laser beam of optical power in the range of 10 mW to 15 mW modulated by a third digital information carrying signal producing an ablation of the photosensitive layers thereby creating a fourth reflectivity of the optical recording structure at the second location in the range of 6% to 12% representative of the third digital information carrying signal wherein the first, second, third, and fourth reflectivities are representative of digital information stored on the optical recording structure.

15. A method to increase the information storage capacity of optical recording structures having first and second photosensitive layers capable of chemical combination and ablation, and having a first reflectivity in the range of 15% to 30%, comprising the steps of:

irradiating the photosensitive layers at a first location by a laser beam of optical power in the range of 4 mW to 8 mW modulated by a first digital information carrying signal producing chemical combination, thereby creating a second reflectivity of the optical recording structure at the first location in the range of 30% to 50% representative of the first digital information carrying signal, and irradiating the photosensitive layer at a second location by a laser beam of optical power in the range of 9 mW to 15 mW modulated by a second digital information carrying signal producing an ablation of the combined photosensitive layers thereby creating a third reflectivity of the optical recording structure at the second location in the range of 6% to 12% wherein the first, second and third reflectivities are representative of digital information stored on the optical recording structure.

* * * * *

UNITED STATES PATENT AND TRADEMARK OFFICE
CERTIFICATE OF CORRECTION

PATENT NO. : 5,056,079
DATED : October 8, 1991
INVENTOR(S) : Chi H. Chung

It is certified that error appears in the above-identified patent and that said Letters Patent is hereby corrected as shown below:

Col. 13, line 53  delete "fist" and insert --first--.

Col. 13, line 60  following "journal", delete "p1".

Signed and Sealed this

Twenty-sixth Day of January, 1993

Attest:

STEPHEN G. KUNIN

*Attesting Officer*    Acting Commissioner of Patents and Trademarks